(12) United States Patent
Kagawa

(10) Patent No.: US 10,501,950 B2
(45) Date of Patent: Dec. 10, 2019

(54) METHOD FOR INJECTING INJECTION FILLER INTO CONCRETE STRUCTURE AND SYRINGE THEREFOR

(71) Applicant: SG Engineering Corporation, Hiroshima-shi (JP)

(72) Inventor: Junichi Kagawa, Hiroshima (JP)

(73) Assignee: SG ENGINEERING CORPORATION, Hiroshima-shi (JP)

( * ) Notice: Subject to any disclaimer, the term of this patent is extended or adjusted under 35 U.S.C. 154(b) by 295 days.

(21) Appl. No.: 15/220,712

(22) Filed: Jul. 27, 2016

(65) Prior Publication Data

US 2017/0030095 A1   Feb. 2, 2017

(30) Foreign Application Priority Data

Jul. 31, 2015   (JP) .................................. 2015-152481

(51) Int. Cl.
*E04G 23/02*     (2006.01)
*B29C 45/14*     (2006.01)
(Continued)

(52) U.S. Cl.
CPC ...... *E04G 23/0211* (2013.01); *B05C 17/0136* (2013.01); *B29C 45/14631* (2013.01); *B29L 2031/776* (2013.01)

(58) Field of Classification Search
CPC ............. E04G 23/0211; B05C 17/0136; B29C 45/14631; B29L 2031/776
(Continued)

(56) References Cited

U.S. PATENT DOCUMENTS 3,575,318 A * 4/1971 Kunz .................... B05B 11/048
                                                            222/326
4,792,066 A * 12/1988 Kobayashi ........ B05C 17/00516
                                                            222/387
(Continued)

FOREIGN PATENT DOCUMENTS

EP            0299121 A1 *  1/1989   ......... E04G 23/0203
JP     WO 8701153 A1 *  2/1987   ......... E04G 23/0203
(Continued)

OTHER PUBLICATIONS

European Patent Application No. 16181899: Extended European Search Report dated Jan. 9, 2017.

*Primary Examiner* — Donnell A Long
(74) *Attorney, Agent, or Firm* — Kratz, Quintos & Hanson, LLP

(57) ABSTRACT

A container body including an expansion tube having a bellows-like wall surface is provided to be filled with an injection filler, the container body communicating with a base having an injection port for pressing the injection filler into a crack portion in a wall surface of concrete or the like via a bellows cap communicating with the body, and upon pressing the injection filler into the crack portion by an extrusion part from the injection port of the base, while the container body maintains a state where the injection filler is injected into the crack portion under pressure from an elastic body of the extrusion part, the injection filler remaining in the container body is manually pressed toward the injection port during a period of time when a state where the remaining injection filler is pressed in is maintained, and then the container body is removed from the base and replaced with a new container body to mount the new container body.

8 Claims, 11 Drawing Sheets

(51) Int. Cl.
*B05C 17/01* (2006.01)
*B29L 31/00* (2006.01)

(58) Field of Classification Search
USPC .................................................. 222/326, 386
See application file for complete search history.

(56) References Cited

U.S. PATENT DOCUMENTS

| | | | | |
|---|---|---|---|---|
| 4,861,401 A * | 8/1989 | Miura | ................. | E04G 23/0203 |
| | | | | 156/94 |
| 5,108,011 A * | 4/1992 | Kobayashi | .............. | B05C 17/01 |
| | | | | 222/153.13 |
| 5,186,949 A * | 2/1993 | Lai | ..................... | E04G 23/0211 |
| | | | | 425/11 |
| 5,238,150 A * | 8/1993 | Williams | ............. | B05B 9/0838 |
| | | | | 222/105 |
| 5,518,145 A * | 5/1996 | Chen | ......................... | B05C 7/00 |
| | | | | 222/1 |
| 6,200,054 B1 * | 3/2001 | Chen | .................. | E04G 23/0203 |
| | | | | 222/386 |

FOREIGN PATENT DOCUMENTS

| | | | |
|---|---|---|---|
| JP | 2009030244 A | * | 2/2009 |
| JP | 2011-132739 A | | 7/2011 |
| JP | 5074118 B2 | | 11/2012 |

* cited by examiner

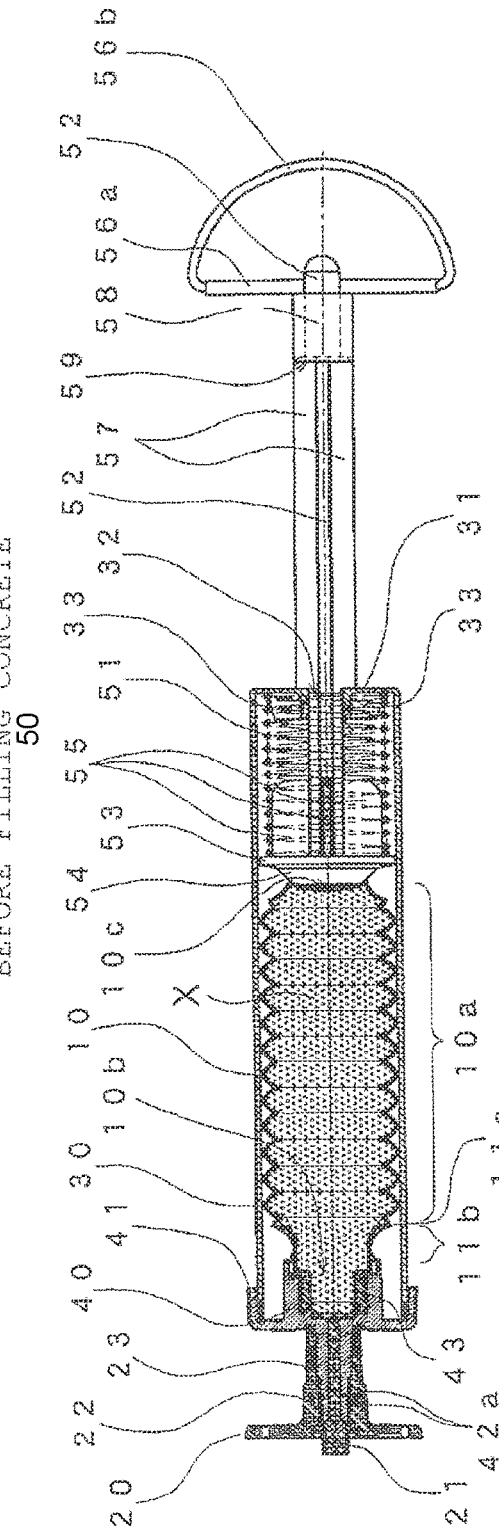
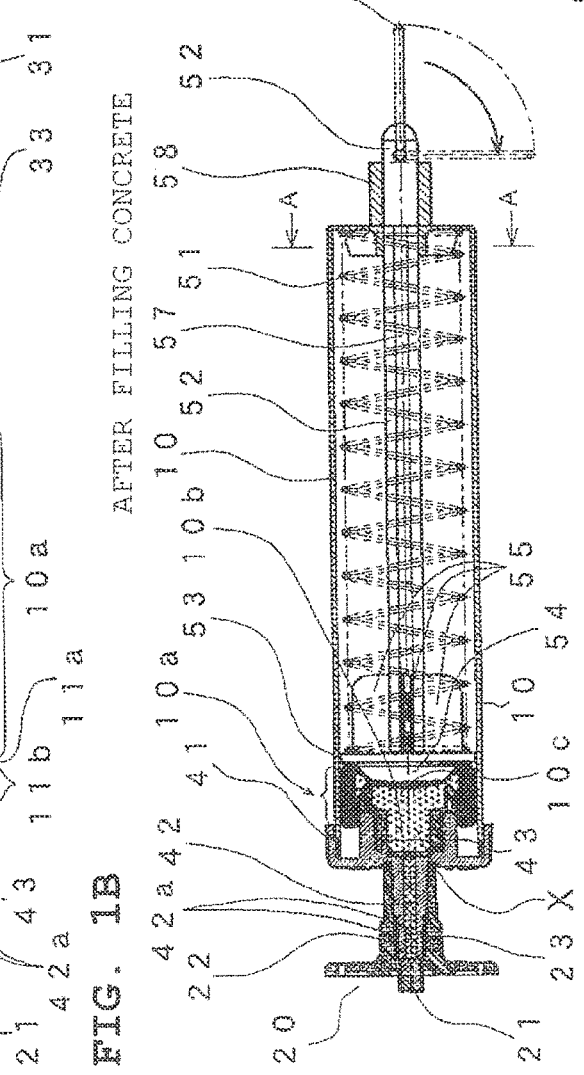
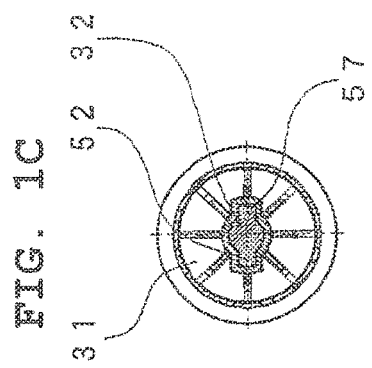

FIG.3A
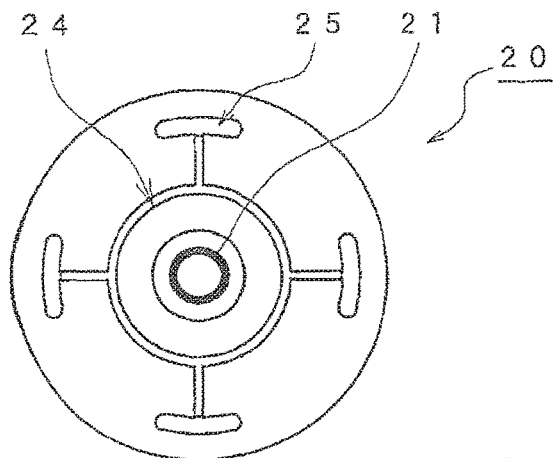
FIG.3B
FIG.3D
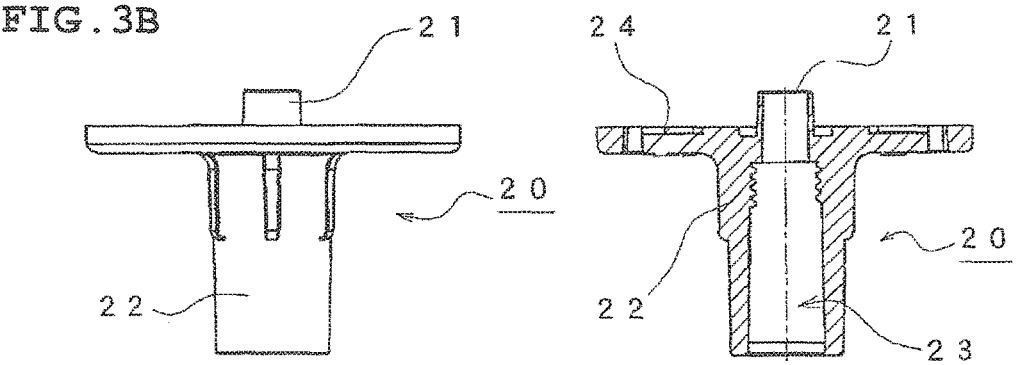
FIG.3C
FIG.3E
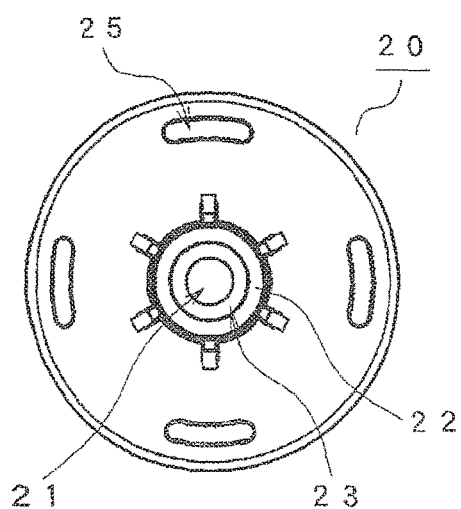
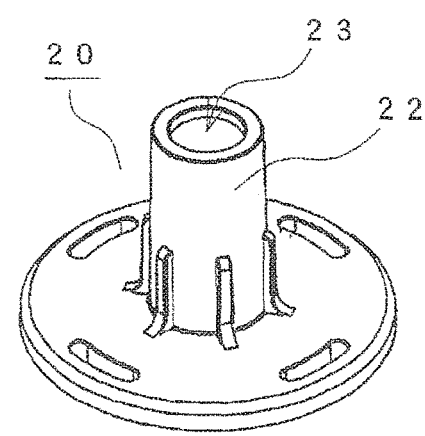

CROSS SECTION ON ARROW A-A

PRIOR ART

METHOD FOR INJECTING INJECTION FILLER INTO CONCRETE STRUCTURE AND SYRINGE THEREFOR

BACKGROUND

Technical Field

The present invention relates to a method for injecting an injection filler into a concrete structure, and a syringe therefor, and particularly relates to an injection method that facilitates a syringe replacement operation that needs experience and also an injection method having the function of increasing density and stabilizing enhancing force also for injection/joint to a minute portion by significantly improving a known syringe in such a manner as to discharge an injection filler straight at the center portion of a crack at a distal end of a drilled hole in a concrete structure, and a syringe therefor.

Related Art

A method is conventionally disclosed which injects resin, cement slurry, or the like by methods such as automatic low pressure resin injection and mechanical (high pressure) resin injection that drills or does not drill a hole not reaching a rear surface of a concrete or mortar wall surface in a void portion of the wall surface.

Furthermore, as another method, there is a method in which a drill machine is used to drill a hole penetrating a concrete housing or wall portion and an injection filler is injected into its rear surface.

Moreover, there is a method for a crack portion, in which resin, cement slurry, or the like is injected directly into the crack from the surface of the crack, or injected into the crack after drilling a hole from near the surface of the crack.

However, in the above methods, air remaining in a syringe or drilled hole is pressed in so that the injection filler is injected while the air is kept in there. Accordingly, the air acts as a counterforce. Hence, there is a disadvantage that the injection filler is injected into the crack surface portion but cannot be injected all the way to an internal void portion and a minute portion of the crack.

Hence, in order to remove the disadvantage, the applicant of the present application has developed a method for injecting an injection filler into a concrete structure, and a syringe that is used for the injection method as in, for example, Patent Document 1.

[Patent Document 1] Japanese Patent No. 5074118 B2

This technology is an epoch-making invention for repair, renovation, and water-sealing, including seismic reinforcement, of a crack, rock pocket, and a space around a steel bar in a concrete structure. However, this invention is a principle and is required for the development of a "method for injecting an injection filler into a concrete structure, and an apparatus therefor" that further improves the technology, improves joint force inside a concrete structure, and enables the reproduction of more stable strength by any constructor irrespective of his/her experience, and also stabilizes the strength enhancement of the cracked concrete structure.

In order to achieve this, it is required to have a structure in which an injection filler in a container body is pointedly discharged straight at a deteriorated crevice, rock pocket, and crack portion in multiple surfaces (such as a floor surface, a ceiling surface, and a wall surface) of concrete or the like from an injection port formed in a base to promote the enhancement of an extrusion shaft portion, and also force the injection filler out perpendicularly, be configured such that a sliding space is ensured, an elastic body such as a coil spring is wound more, and a deformation of a pressed bellows-like wall surface of the container body is attempted to be eliminated, and be configured such that air in a crack, a cold joint, and a rock pocket portion is discharged with high accuracy (that is, the function of being capable of discharging the injection filler straight at the center portion of the diameter of a drilled hole), and accordingly compaction can be performed in a pressurized state to stabilize injection/joint to a minute portion.

An object of the present invention is to develop and provide a method for injecting an injection filler into a concrete structure configured to pointedly discharge the injection filler straight at a crack portion of a concrete structure in such a manner as to strike the core while maintaining an extrusion shaft in a straight line, and an apparatus for the method.

SUMMARY

Firstly, an injection method of an injection filler into a concrete structure according to a first aspect of the present invention is a method for injecting an injection filler into a crack, rock pocket, and a void portion around a steel bar in a concrete structure, and includes:

providing a container body, including an expansion tube having a bellows-like wall surface, to be filled with an injection filler;

providing the container body communicating with a base having an injection port for pressing the injection filler into a crack portion and a void portion in a wall surface, a floor surface, or the like of concrete or the like, via a bellows cap communicating with the container body; and upon pressing the injection filler filled in the container body by an extrusion part into the crack portion and the void portion in the wall surface of concrete or the like from the injection port of the base, while maintaining a state where the injection filler is injected into the crack portion under pressure from an elastic body, such as a coil spring, of the extrusion part, in a state where a reserve capacity space where the injection filler remaining in the container body can be manually pressed toward the injection port within a time during which a state where the remaining injection filler is pressed in is maintained, and is pressurized to not change the filling flow velocity, removing the container body from the base to replace the container body with and mount a new container body filled with a new injection filler.

Next, a syringe of an injection filler into a concrete structure according to a second aspect of the present invention is a syringe for injecting an injection filler into a crack, rock pocket, and a void portion around a steel bar in a concrete structure, and includes:

a container body, including an expansion tube having a bellows-like wall surface, to be filled with an injection filler;

an external cylinder at an outer perimeter of the container body; and an injection/outlet of the container body and a bellows cap, at one end of the external cylinder, wherein the bellows cap communicates with a base having an injection port for pressing the injection filler in, the container body includes a rear end communicating with the injection/outlet of the injection filler filled in the container body by an extrusion part, the bellows cap, and the base, and the injection filler is pressed into a crack portion by an elastic force of an elastic body, such as a coil spring, of the extrusion part.

It is characterized in that the container body forms the bellows-like wall surface, the container body is provided at a distal end with the injection/outlet, the container body is provided at the other end with a concave pressed portion, and the pressed portion is formed into a shape fitted to a convex extrusion portion formed on a pressing plate of an extrusion shaft portion forming the extrusion part.

It is characterized in that the base is provided at one end with the protruding injection port for pressing the injection filler into the crack portion, and at a rear end with a projecting holding body, the holding body forms a communication hole communicating with the injection port, and includes a female thread in the communication hole, and the female thread is threadedly engaged with a male thread having a slit drilled in the bellows cap.

It is characterized in that the external cylinder is a housing being open at one end and being blocked by a blocking body at the other end, the open end of the external cylinder includes a male thread around a perimeter thereof, the male thread being threadedly engaged with a female thread provided to an inner wall of an outer peripheral cover of the bellows cap, and the blocked other end of the external cylinder includes an insertion hole into which the extrusion shaft portion is inserted in a movable manner, and inside the blocking body, a plurality of guide frames having an appropriate length in an axial direction and being formed radially.

It is characterized in that the extrusion part includes, at a distal end, a pressing plate on which a convex extrusion portion fitted to the pressed portion is formed, and an elastic body attachment projection, and an extrusion shaft portion having a pull handle at a rear end, and the elastic body such as a spring is loosely fitted to the extrusion shaft portion and is press fitted between the pressing plate and the blocking body of the external cylinder.

It is characterized in that the extrusion shaft portion includes one or more pairs of guided vanes at the middle of the shaft portion in a radial direction with respect to a major axis direction of the shaft portion, and the guided vanes are pulled to the outside of the blocking body to be rotated and fixed at an angle other than the insertion hole, and accordingly the elastic body such as a spring is compressed to press the injection filler in the container body into the crack portion.

It is characterized in that the pull handle is inserted in a rotatable manner into an end of the extrusion shaft portion, and is formed into a "D" shape with a straight rod that is longer than the dimension of the diameter of the external cylinder and an arc-shaped rod whose ends are inserted into the straight rod.

It is characterized in that a spacer is provided between the guided vanes of the extrusion shaft portion and the straight rod of the pull handle.

According to the present invention, a slit (42a) is formed in a male thread of a projecting holding body (22) of a bellows cap (40) communicating with a container body (10). Accordingly, air existing in a crack or rock pocket at the start of injection of an injection filler (X), which returns to the direction of the container body (10) due to the injection of the injection filler (X), can be removed from the slit to the outside. Upon replacement with a new injection filler, the injection filler (X) that is currently being inserted is manually pressed in the direction of a crack portion (B), normally within five seconds (although it depends on the viscosity of the filler). The air in the crack portion (B) is forced out by a pressing force of the injection filler (X) from a concave hole (25) communicating with a substantially ring-shaped shallow groove (24) of a base (20) to the outside (called the suction action). Therefore, it becomes possible to join and fill the new injection filler deep into a distal end in concrete without air remaining in the crack portion (B). Accordingly, there is a useful effect of, for example, stabilizing enhancement in concrete.

Moreover, according to the present invention, a concave pressed portion (10c) formed at the other end of the container body (10) is provided to be formed into a shape fitted to a convex extrusion portion (54). Accordingly, when an extrusion shaft portion (52) of an extrusion part (50) is used to press with an elastic force of an elastic body (51) such as a coil spring, the extrusion shaft portion (52) moves in the axial direction of the container body (10) without deforming it. Accordingly, there are effects of, for example, being capable of reducing the remaining amount of the injection filler (X) in the container body (10) having a bellows-like wall surface, and pressing the injection filler (X) into the crack portion (B).

Furthermore, according to the present invention, the diameter of a pleat near an injection/outlet (10b) of a bellows-like wall surface (10a) of the container body (10) is formed to be smaller than that of each pleat located at the bellows-like wall surface (10a) to have a deformed pleat (11a). In addition, a wall surface (11b) leading from the pleat (10a) to the injection/outlet (10b) is formed to have an appropriate length. Accordingly, an outer peripheral portion of each pleat of the bellows-like wall surface (10a) is folded into itself by forcing the injection filler (X) out by the extrusion shaft portion (52) of the extrusion part (50), the pressure of the elastic body (51) such as a coil spring, and the like, and then is forced out into a ring-shaped gap portion between the injection/outlet (10b) of the bellows cap (40) and an external cylinder (30) to crush the bellows-like wall surface (10a) of the container body (10) completely. Accordingly, there are also effects of, for example, being capable of reducing the remaining amount of the injection filler (X) in the container body (10), and reducing the rate of loss.

Moreover, the base (20) is provided at one end with a protruding injection port (21) for pressing the injection filler (X) into the crack portion (B), and at a rear end with a projecting holding body (22). A communicating hole (23) communicating with the injection port (21) is formed in the holding body (22). In addition, a female thread is provided in the communicating hole (23). The female thread is threadedly engaged with a male thread having a slit (42a) drilled in the bellows cap (40). Accordingly, the air existing in the crack portion (B) or rock pocket at the start of injection of the injection filler (X) can be removed from the slit (42a). Consequently, there is an effect of, for example, being capable of filling the injection filler (X) deep into the end in concrete.

Moreover, according to the present invention, the extrusion shaft portion (52) moves slidingly within an insertion hole (32) provided in a blocking body (31) of the external cylinder (30), and also slides such that its movement is guided by a guide frame (33) in the same direction as the axial direction of the external cylinder (30). Accordingly, there is an effect of, for example, being capable of ensuring crush without deforming the container body (10).

Moreover, according to the present invention, a pull handle (56) provided at an end of the extrusion shaft portion (52) is formed into a "D" shape. Accordingly, it is constructed such that fingers can be placed in the "D" portion even if the elastic force of the elastic body (51) such as a coil spring is strong, at least three fingers can be placed therein. Accordingly, there is an effect of facilitating the setting without a need for a large force.

Moreover, according to the present invention, a straight rod (56a) of the pull handle (56) provided at the end of the extrusion shaft portion (52) is longer than the diameter of the external cylinder (30). Accordingly, the straight rod can prevent the rolling of the external cylinder (30). Accordingly, there is an effect of, for example, preventing the breakage of an injection filling device in which the injection filler (X) is set due to the fall of the injection filling device during work at height.

Furthermore, according to the present invention, a spacer (58) is provided between guided vanes (57) of the extrusion shaft portion (52) and the blocking body (31) of the external cylinder (30). Accordingly, when the extended elastic body (51) such as a coil spring is extended/compressed for setting, it is possible to hold the straight rod (56a) of the pull handle (56) with the fingers to pull the straight rod (56a). Therefore, there is an effect of, for example, easy setting.

BRIEF DESCRIPTION OF DRAWINGS

FIGS. 1A to 1C illustrate one embodiment of the present invention, FIG. 1A is a partially cut cross-sectional view illustrating a state before pressing into concrete, FIG. 1B is a partially cut cross-sectional view illustrating a state after pressing into concrete, and FIG. 1C is a cross-sectional view on A-A of FIG. 1B;

FIG. 2A is a plan view, FIG. 2B is a partially cut front view, and FIG. 2C is a bottom view;

FIGS. 3A to 3E illustrate one embodiment of a base used for the present invention, FIG. 3A is a plan view, FIG. 3B is a front view, FIG. 3C is a bottom view, FIG. 3D is a cross-sectional view, and FIG. 3E is a perspective view;

FIG. 4A is a front view, FIG. 4B is a bottom view, and FIG. 4C is a cross-sectional view;

FIG. 5A is a plan view, FIG. 5B is a front view, FIG. 5C is a bottom view, and FIG. 5D is an enlarged cross-sectional view of the bellows cap described in FIG. 5A as viewed from the side direction;

FIG. 6A is a cross-sectional view of a state where a male thread of a holding body is loose, and FIG. 6B is a cross-sectional view illustrating a tightened state;

FIG. 7A is a plan view, FIG. 7B is a front view and a left side view, and FIG. 7C is a bottom view;

FIG. 8A is a plan view, FIG. 8C is a perspective view;

FIG. 11A is a partially cut front view, FIG. 11B is a bottom view, FIG. 11C is a main part cross-sectional view, and FIG. 11D is a plan view.

DETAILED DESCRIPTION

Figure 2A:
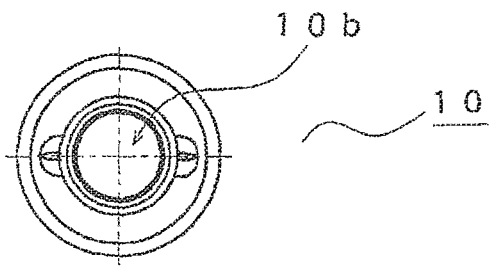
FIGS. 2A to 2C illustrate one embodiment of a container used for the present invention.

A detailed description will hereinafter be given of an embodiment of the present invention. The present invention is not limited to the following description, and can be changed within a range that does not depart from the gist of the present invention.

Embodiment

Firstly, a description is given of a method for injecting an injection filler into a concrete structure according to a first aspect of the present invention, with reference to FIGS. 1A, 1B, and 1C, and 10. A method for injecting an injection filler into a crack, rock pocket, and a void portion around a steel bar in a concrete structure includes providing a container body (10), comprised of an expansion tube having a bellows-like wall surface (10a), to be filled with an injection filler (X), providing the container body (10) communicating with a base (20) having an injection port (21) for pressing the injection filler (X) into a crack portion (B) in a wall surface being a concrete surface (A), via a bellows cap (40) communicating with the container body, and upon pressing the injection filler (X) filled in the container body (10) by an extrusion part (50) into the crack portion (B) or the like in the concrete surface (A) such as a floor surface, ceiling surface, or wall surface from the injection port (21) of the base (20), while maintaining a state where the injection filler (X) is injected into the crack portion (B) under pressure from an elastic body (51) such as a coil spring of the extrusion part (50), manually pressing the injection filler (X) remaining in the container body (10) toward the injection port (21) within a time during which a state where the remaining injection filler (X) is pressed in is maintained, and then removing the container body (10) from the base (20) to replace it with and mount a new container body (10') filled with a new injection filler (X).

The above-mentioned "within a time during which the state where the remaining injection filler (X) in the container body (10) is pressed in is maintained" is different depending on the viscosity of the injection filler (X), but is normally approximately five seconds. This is means of maintaining the velocity of flow and preventing air bubbles from being mixed in.

Next, a description is given of a syringe of an injection filler into a concrete structure according to a second aspect of the present invention, with reference to FIGS. 1A to FIG. 9. The syringe of an injection filler into a concrete structure is a syringe for injecting a filler into a crack, rock pocket, or a space around a steel bar in concrete. The syringe includes a container body (10), comprised of an expansion tube having a bellows-like wall surface (10a), to be filled with an injection filler (X). The container body (10) is provided with an external cylinder (30) in the coaxial direction, held in the external cylinder. A bellows cap (40) to be threadedly engaged with one end of the external cylinder and an injection/outlet (10b) of the container body is provided. The bellows cap is provided communicating with a base (20) having an injection port (21) for pressing the injection filler (X) in. A rear end of the container body (10) is provided communicating the injection/outlet (10b) of the injection filler (X) filled in the container body by an extrusion part (50), the bellows cap (40), and the base (20). The injection filler (X) is pressed into a crack portion (B) by an elastic force of an elastic body (51), such as a coil spring, of the extrusion part (50).

Furthermore, the diameter of the injection/outlet (10b) of the container body (10) is formed to be wide. Accordingly, the injection filler (X) is easy to be filled. Moreover, various kinds of injection materials, for example, polymer materials including blast furnace slag can also be filled.

Figure 2B:
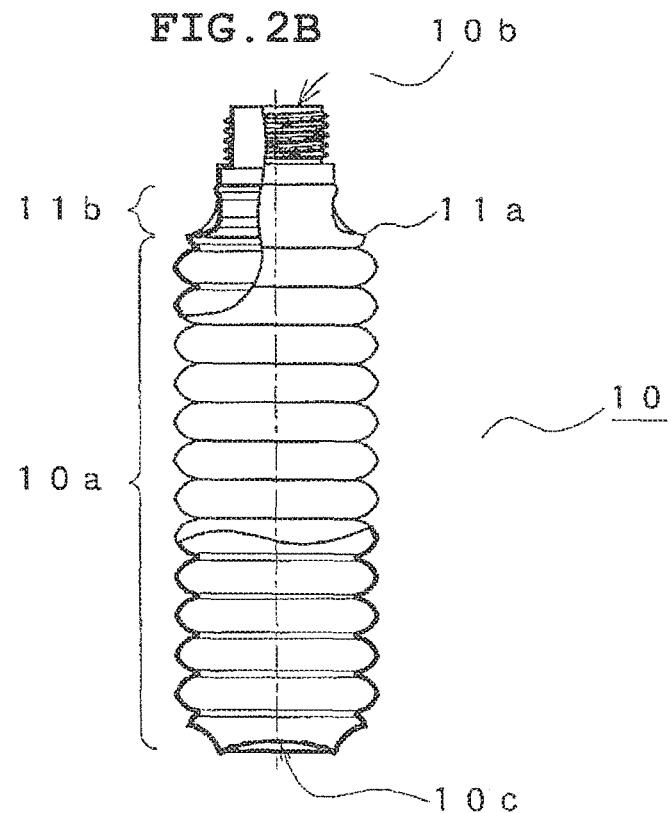
Figure 2C:
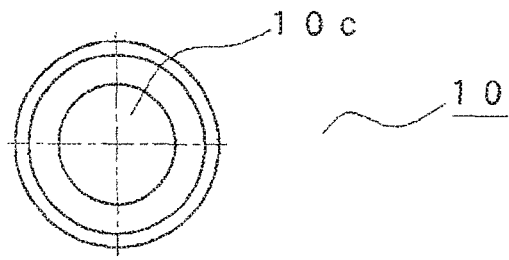

As illustrated in FIGS. 2A to 2C, the syringe of an injection filler into a concrete structure is characterized in that the container body (10) forms a bellows-like wall surface (10a), the container body (10) is provided at a distal end with the injection/outlet (10b), and is formed and provided at the other end with a concave pressed portion (10c), and the pressed portion (10c) is formed into a shape fitted to a convex extrusion portion (54) formed on a pressing plate (53) of an extrusion shaft portion (52) forming the extrusion part (50).

Moreover, the syringe of an injection filler into a concrete structure is characterized in that the diameter of a pleat near the injection/outlet (10b) at the bellows-like wall surface (10a) of the container body (10) is smaller than that of each pleat located at the bellows-like wall surface (10a) to have a deformed pleat (11a), and a wall surface (11b) leading from the deformed pleat to the injection/outlet (10b) is formed to have an appropriate length.

Furthermore, as illustrated in FIGS. 3A to 3E, FIGS. 6A and 6B, the base (20) is fixed to a wall surface being a concrete surface (A) to press in the injection filler (X) filled in the container body (10) from the injection port (21) inserted into the crack portion (B). Moreover, as illustrated in FIGS. 3A to 3E, the base (20) is provided on the injection port (21) side with a substantially ring-shaped shallow groove (24) and four concave holes (25) communicating with each other via shallow grooves extending in a cross shape from the shallow groove (24). When the base (20) is fixed to the wall surface being the concrete surface (A), the shallow groove (24) becomes a communication hole to serve as an escape route of air in the crack portion (B).

Figure 4A:
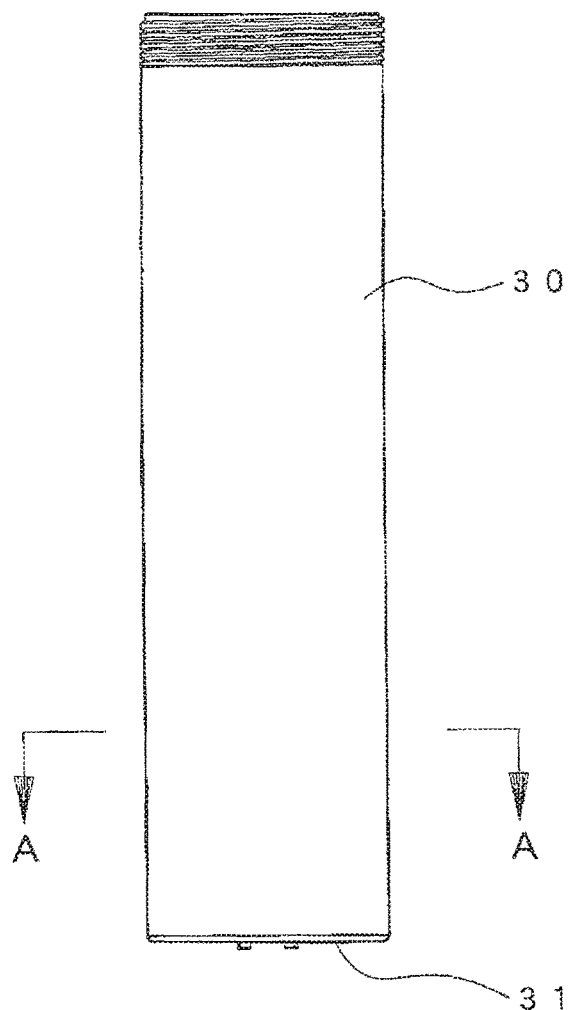
FIGS. 4A to 4C illustrate one embodiment of an external cylinder used for the present invention.
Figure 4B:
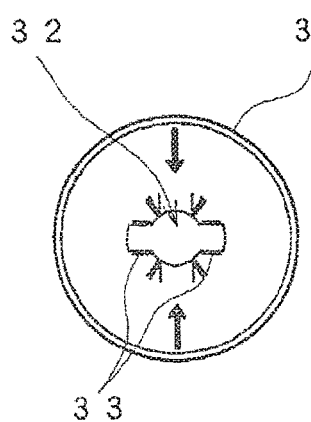
Figure 4C:
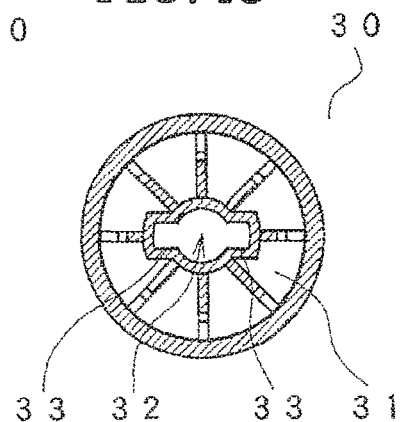
Figure 5A:
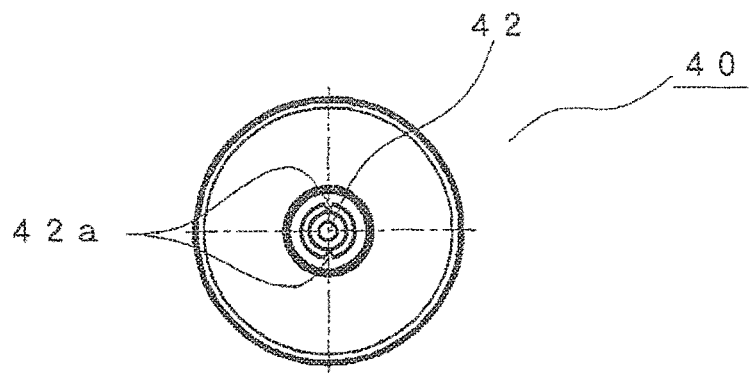
FIGS. 5A to 5D illustrate one embodiment of a bellows cap used for the present invention.
Figure 5B:
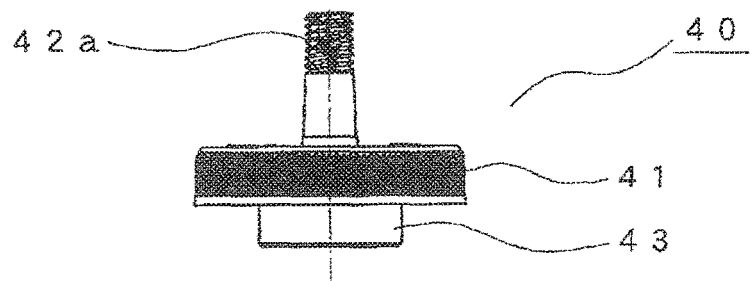
Figure 5C:
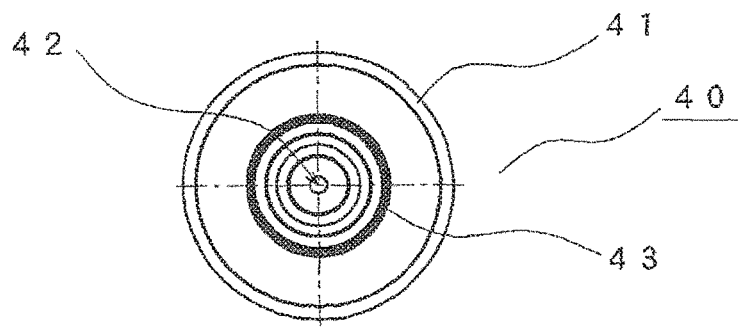
Figure 5D:
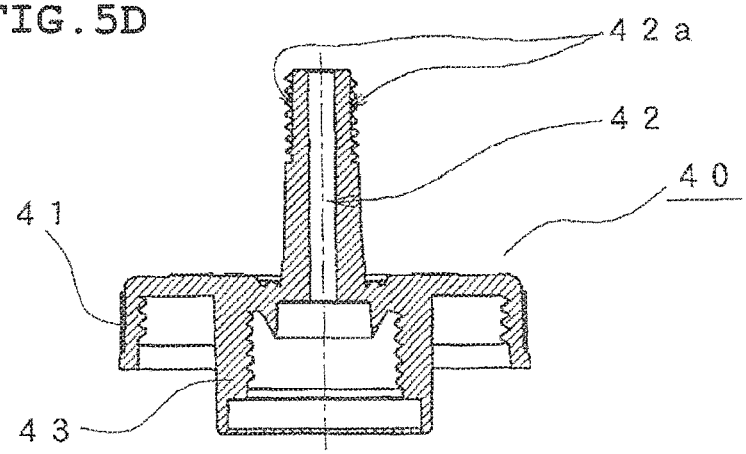
Figure 6A:
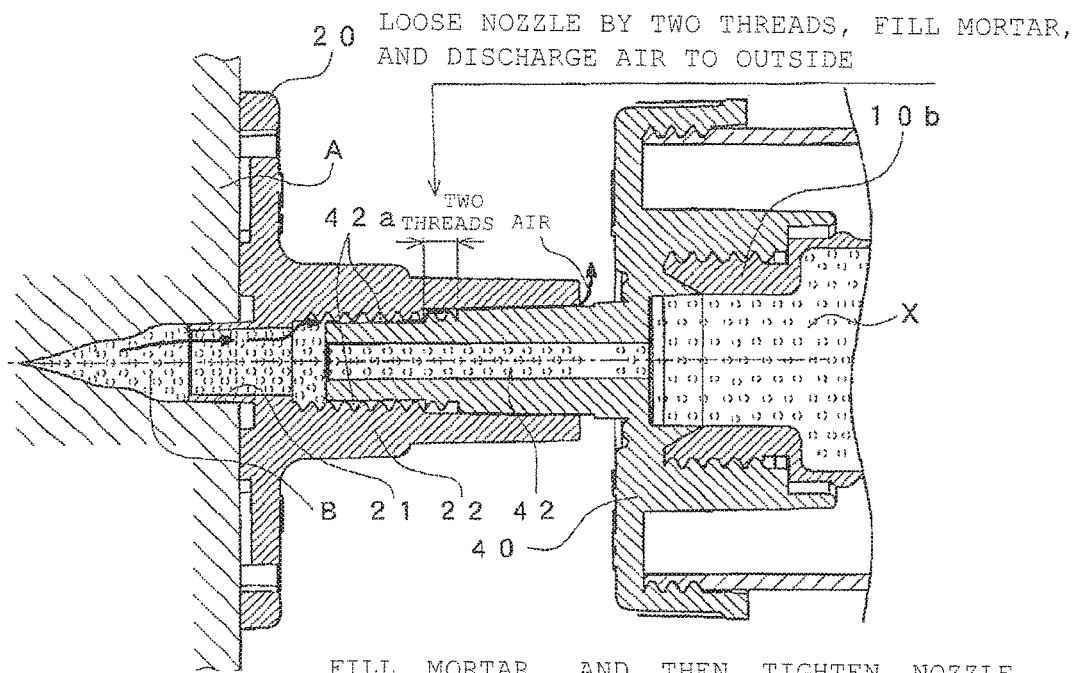
FIGS. 6A and 6B illustrate one embodiment of a method for using the bellows cap used for the present invention.
Figure 6B:
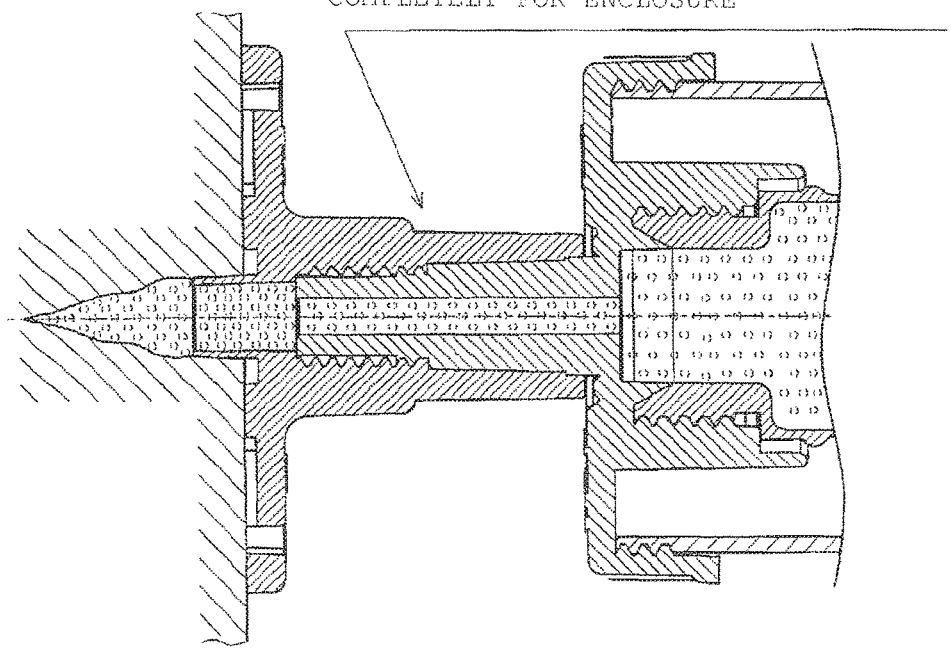

As illustrated in FIGS. 4A to 4C, the syringe of an injection filler into a concrete structure is characterized in that the external cylinder (30) is a housing that is open at one end and blocked by a blocking body (31) at the other end, the open end of the external cylinder (30) is provided around the perimeter with a male thread that is threadedly engaged with a female thread provided to an inner wall of an outer peripheral cover (41) of the bellows cap (40), and the blocked other end of the external cylinder (30) is provided with an insertion hole (32) into which the extrusion shaft portion (52) is inserted in a movable manner, and on an inner side of the blocking body (31) with a plurality of guide frames (33) having an appropriate length in the axial direction and being formed radially.

Moreover, as illustrated in FIGS. 5A to 5D, it is configured such that the bellows cap (40) is threadedly engaged with and connected to the base (20), and a bellows cap communication hole (42) communicates with a communicating hole (23) having a female thread formed in the base (20) and also communicates with the injection port (21).

Furthermore, the bellows cap (40) is configured to be threadedly engaged with the outer peripheral cover (41) threadedly engaged with the external cylinder (30) and an inner cover (43) threadedly engaged with the container body (10).

Figure 7A:
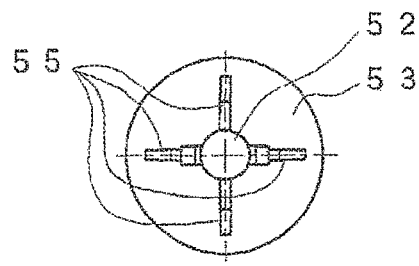
FIGS. 7A to 7C illustrate one embodiment of an extrusion shaft portion used for the present invention.
Figure 7B:
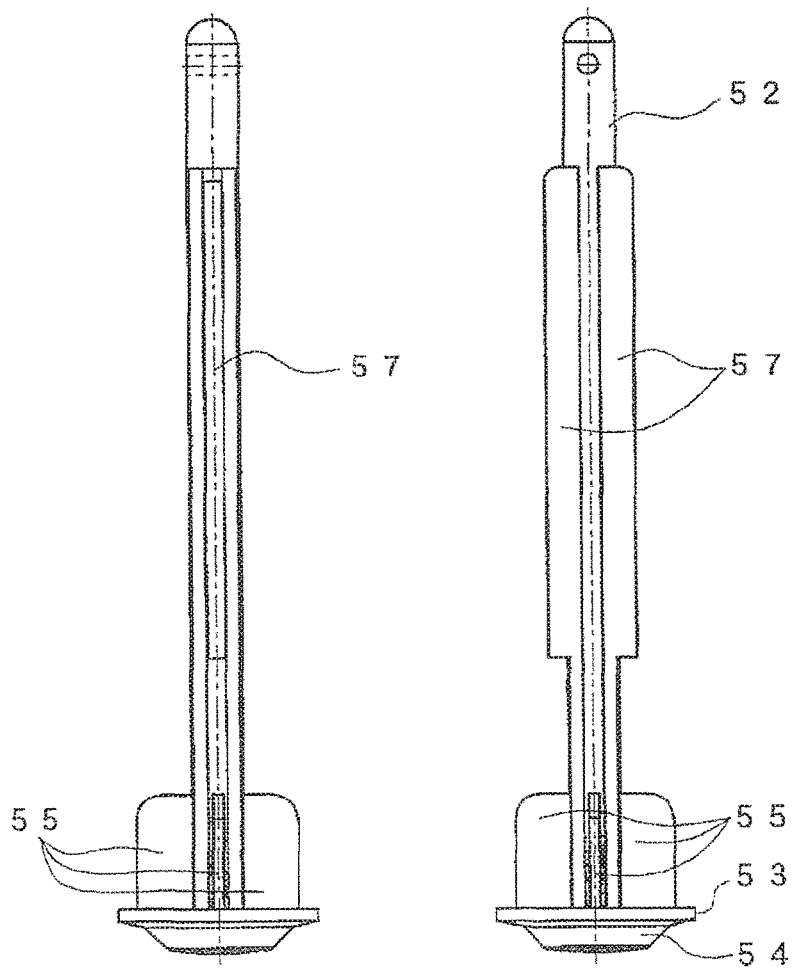
Figure 7C:
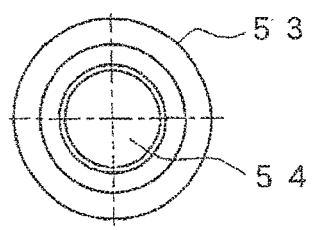

As illustrated in FIGS. 7A to 7C, the syringe of an injection filler into a concrete structure is characterized in that the pressing plate (53) on which the convex extrusion portion (54) fitted to the pressed portion (10c) is formed, and elastic body attachment projections (55) are formed at a distal end of the extrusion part (50), the extrusion shaft portion (52) is provided at a rear end with a pull handle (56), and the elastic body (51) such as a spring is loosely fitted to the extrusion shaft portion (52) and is press fitted between the pressing plate (53) and the blocking body (31) of the external cylinder (30). Eight elastic body attachment projections (55) are radially provided to reinforce the blocking body (31) of the external cylinder (30). In addition, one end of the elastic body (51) such as a coil spring is provided in between with the external cylinder (30). Accordingly, it is configured to prevent the elastic body (51) from moving and deforming.

Moreover, the syringe of an injection filler into a concrete structure is characterized in that the extrusion shaft portion (52) is radially provided at the middle of the shaft portion with one or more pairs of guided vanes (57) with respect to the major axis direction of the shaft portion, and the guided vanes (57) are pulled to the outside of the blocking body (31) to be rotated and fixed at an angle other than the insertion hole (32), and accordingly the elastic body (51) such as a spring is compressed to press the injection filler (X) in the container body (10) into the crack portion (B).

Figure 9:
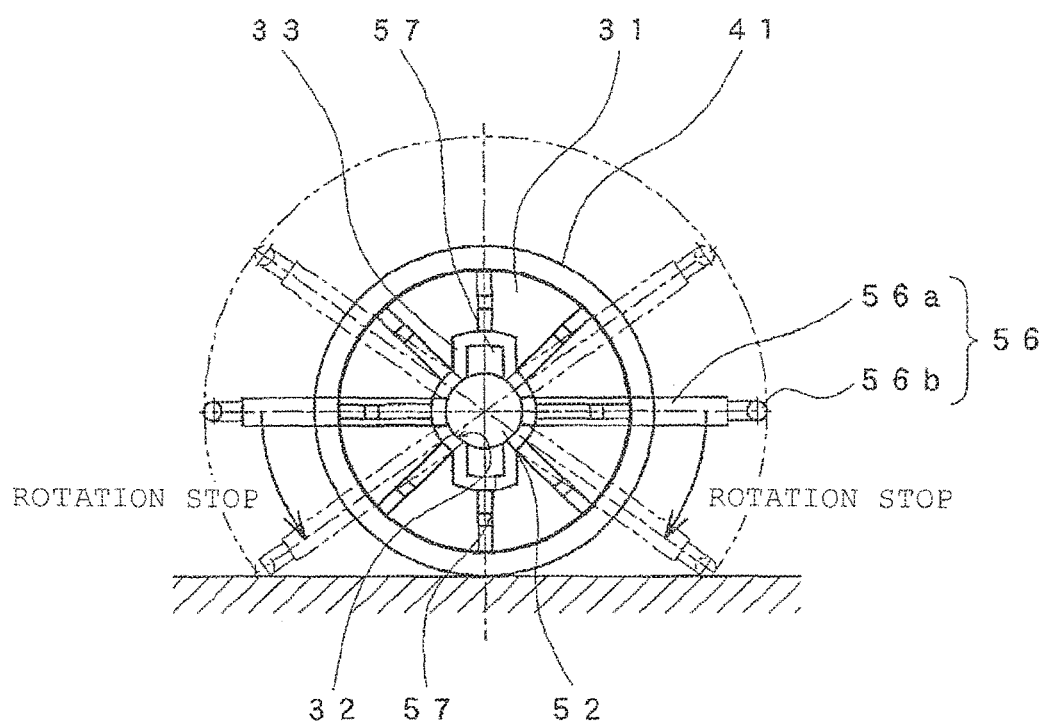
FIG. 9 is an explanatory diagram illustrating one embodiment of a pull handle and the external cylinder, which are used for the present invention.
Figure 10:
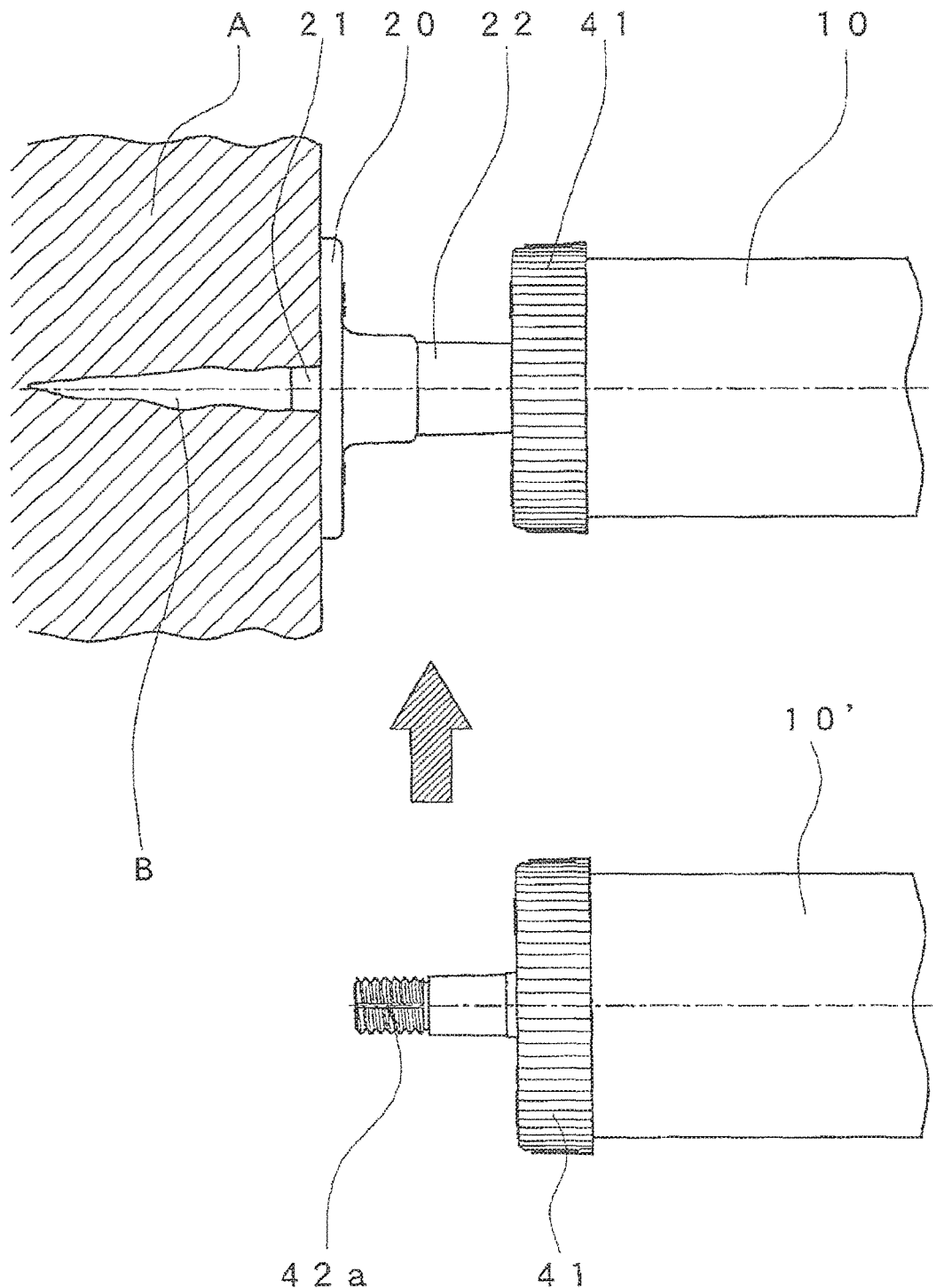
FIG. 10 is an explanatory diagram used for the present invention.
Figure 11A:
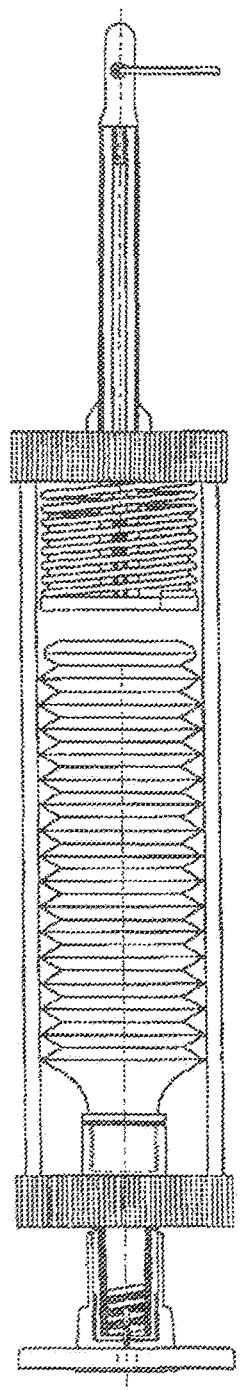
FIGS. 11A to 11D illustrate a conventional example.
Figure 11D:
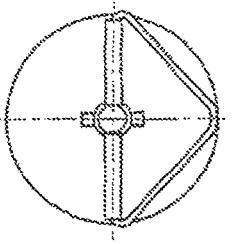
Figure 11C:
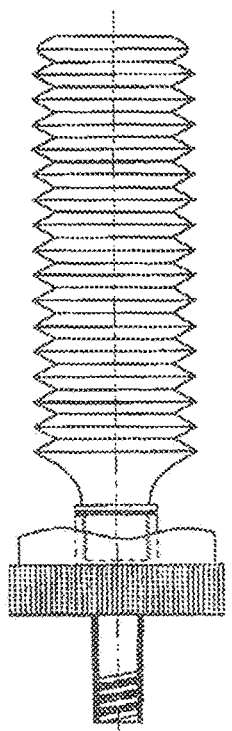
Figure 11B:
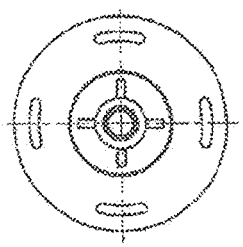

Furthermore, as illustrated in FIG. 9, the syringe of an injection filler into a concrete structure is characterized in that the pull handle (56) is rotatably inserted into an end of the extrusion shaft portion (52), and is formed into a "D" shape by a straight rod (56a) that is longer than the dimension of the diameter of the external cylinder (30) and an arc-shaped rod (56b) whose ends are inserted in the straight rod.

Figure 8A:
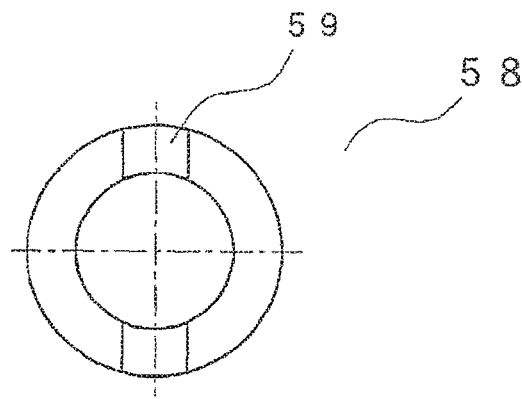
FIGS. 8A and 8C illustrate one embodiment of a spacer of extrusion shaft portion used for the present invention.
Figure 8B:
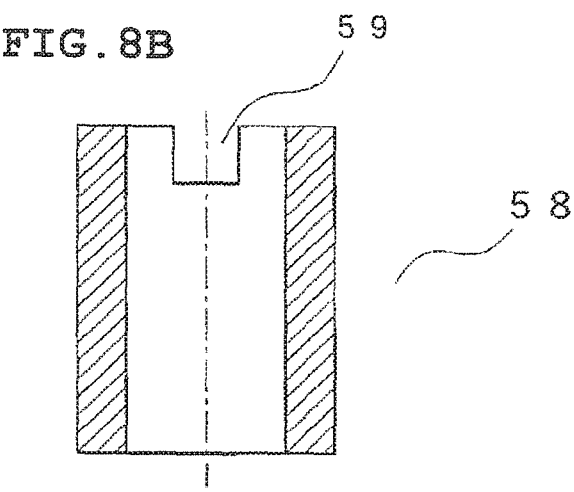
FIG. 8B is a cross-sectional view.
Figure 8C:
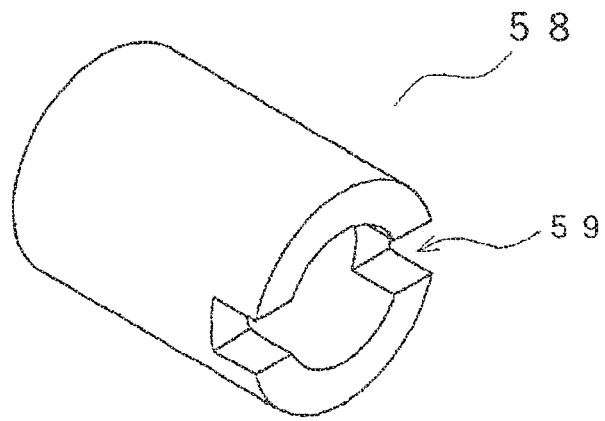

The syringe of an injection filler into a concrete structure is characterized in that a spacer (58) of a shape illustrated in FIGS. 8A to 8C is provided between the guided vanes (57) of the extrusion shaft portion (52) and the straight rod (56a) of the pull handle (56). The spacer (58) is provided with concave grooves (59) in the diameter direction. The concave grooves are fitted to the guided vanes (57).

Next, a construction method using the present invention is described. A crack portion that does not penetrate through to the back and the side of the structure is selected from the crack portions (B) in the concrete surface (A). Dust, oily soils, coatings, and the like around the selected crack portion are cleaned to expose the intrinsic wall surface, which is checked to be dry.

A hole to which the injection port (21) of the base (20) can be fitted is drilled in the crack portion (B) by a drill machine (not illustrated). At the same time, chips are attracted while injection water is poured. The inside of the crack portion is cleaned. After it becomes dry, it is checked to be sure that the intrinsic wall surface is formed and dry.

Crack portions penetrating through to the back and the side of the concrete surface (A) are ensured to be sealed to prevent liquid leakage. Moreover, the vicinity of the base (20) and a distal end/minute portion of a branched crack are also carefully sealed. Therefore, injection becomes possible.

The base (20) is fixed by an adhesive to the wall surface being the concrete surface (A), but the adhesive is applied in a donut form to prevent the blockage of the injection port (21) of the base.

The bellows cap (40) is fixed to the base (20) to set the container body (10) filled with the injection filler (X). It is natural that the container body (10) is integrally provided with the external cylinder (30) that holds the container body (10), and the extrusion part (50) at the rear.

Furthermore, as illustrated in FIG. 1A, the pull handle (56) of the extrusion part (50) is pulled backward. The extrusion shaft portion (52) is rotated 90°. As illustrated in FIG. 1B, the elastic body (51) such as a coil spring gradually presses the pressing plate (53) of the extrusion part (50) by the elastic force with the blocking body (31) as a counterforce. The injection filler (X) in the container body (10) is then pressed into the crack portion (B) or the like in a floor surface, ceiling surface, or wall surface being the concrete surface (A). New container bodies (10') are replaced to repeat refilling until the injection is complete. When the elastic body (51) such as a coil spring stops stretching, then the injection is complete.

A technology of a method for injecting an injection filler into a concrete structure and a syringe therefor according to the present invention is established and carried out. Accordingly, there is industrial applicability.

What is claimed is:

1. A syringe for injecting an injection filler into a crack, rock pocket, and a void portion around a steel bar in a concrete structure, the syringe comprising:
    a container body (10), including an expansion tube having a bellows-like wall surface (10a), to be filled with an injection filler (X);
    an external cylinder (30) at an outer perimeter of the container body (10); and
    an injection/outlet (10b) of the container body (10) and a bellows cap (40) having a slit (42a), at one end of the external cylinder (30), the bellows cap (40) communicating with a base (20) having an injection port (21) for pressing the injection filler (X) in, the container body (10) including a rear end communicating with the injection/outlet (10b) by an extrusion part (50), the slit (42a) of the bellows cap (40), and the base (20), the injection filler (X) being pressed into a crack portion (B) by an elastic force of an elastic body (51) of the extrusion part (50), wherein
    the container body (10) is provided at a distal end with the injection/outlet (10b),
    the container body (10) is provided at the other end with a concave pressed portion (10c),
    the pressed portion (10c) has a shape fitted to a convex extrusion portion (54) formed on a pressing plate (53) of an extrusion shaft portion (52) forming the extrusion part (50), and
    the largest diameter of a first pleat (11a) nearest the injection/outlet (10b) at the bellows-like wall surface (10a) of the container body (10) is smaller than the largest diameter of a pleat located at the bellows-like wall surface (10a).

2. The syringe for injecting an injection filler into a crack, rock pocket, and a void portion around a steel bar in a concrete structure according to claim 1, wherein
    a wall surface (11b) leads from the first pleat to the injection/outlet (10b).

3. The syringe for injecting an injection filler into a crack, rock pocket, and a void portion around a steel bar in a concrete structure according to claim 1, wherein
    the external cylinder (30) is a housing being open at one end and being blocked by a blocking body (31) at the other end,
    the open end of the external cylinder (30) includes a male thread around a perimeter thereof, the male thread being threadedly engaged with a female thread provided to an inner wall of an outer peripheral cover (41) of the bellows cap (40), and
    the blocked other end of the external cylinder (30) includes an insertion hole (32) into which the extrusion shaft portion (52) is inserted in a movable manner, and inside the blocking body (31), a plurality of guide frames (33) having a length in an axial direction and being formed radially with respect to a major axis direction of the extrusion shaft portion (52).

4. The syringe for injecting an injection filler into a crack, rock pocket, and a void portion around a steel bar in a concrete structure according to claim 1, wherein
    the extrusion part (50) includes, at a distal end, the pressing plate (53) on which the convex extrusion portion (54) fitted to the pressed portion (10c) is formed, and an elastic body attachment projection (55), and the extrusion shaft portion (52) having a pull handle (56) at a rear end, and
    the elastic body (51) is fitted to the extrusion shaft portion (52) and is press fitted between the pressing plate (53) and a blocking body (31) of the external cylinder (30).

5. The syringe for injecting an injection filler into a crack, rock pocket, and a void portion around a steel bar in a concrete structure according to claim 1, wherein
    the extrusion shaft portion (52) includes one or more pairs of guided vanes (57) at the middle of the shaft portion in a radial direction with respect to a major axis direction of the shaft portion, and
    the guided vanes (57) are configured to be pulled to the outside of a blocking body (31) and configured to be rotated and fixed at an angle other than the insertion hole (32), and accordingly the elastic body (51) is configured to be compressed to press the injection filler (X) in the container body (10) into the crack portion (B).

6. The syringe for injecting an injection filler into a crack, rock pocket, and a void portion around a steel bar in a concrete structure according to claim 1, wherein
    a pull handle (56) is inserted in a rotatable manner into an end of the extrusion shaft portion (52), and is formed into a "D" shape with a straight rod (56a) longer than the dimension of the diameter of the external cylinder (30) and an arc-shaped rod (56b) whose ends are inserted into the straight rod.

7. The syringe for injecting an injection filler into a crack, rock pocket, and a void portion around a steel bar in a concrete structure according to claim 1, wherein
    a spacer (58) is provided between guided vanes (57) of the extrusion shaft portion (52) and a straight rod (56a) of a pull handle (56).

8. The syringe for injecting an injection filler into a crack, rock pocket, and a void portion around a steel bar in a concrete structure according to claim 1, wherein the largest diameter of a last pleat having the pressed portion (10c) and nearest the convex extrusion portion (54) is smaller than the largest diameter of the pleat located at the bellows-like wall surface (10a).

* * * * *